United States Patent
Boehmke (10) Patent No.: US 11,740,355 B2
(45) Date of Patent: Aug. 29, 2023

(54) ADJUSTABLE BEAM PATTERN FOR LIDAR SENSOR

(71) Applicant: UATC, LLC, San Francisco, CA (US)

(72) Inventor: Scott Boehmke, Pittsburgh, PA (US)

(73) Assignee: UATC, LLC, Mountain View, CA (US)

( * ) Notice: Subject to any disclaimer, the term of this patent is extended or adjusted under 35 U.S.C. 154(b) by 562 days.

(21) Appl. No.: 16/859,650

(22) Filed: Apr. 27, 2020

(65) Prior Publication Data

US 2020/0257000 A1    Aug. 13, 2020

Related U.S. Application Data

(63) Continuation of application No. 16/035,862, filed on Jul. 16, 2018, now Pat. No. 10,677,925, which is a continuation of application No. 15/379,854, filed on Dec. 15, 2016, now Pat. No. 10,338,225.

(60) Provisional application No. 62/267,785, filed on Dec. 15, 2015.

(51) Int. Cl.
| | |
|---|---|
| *G01S 17/42* | (2006.01) |
| *G01S 17/89* | (2020.01) |
| *G01S 7/48* | (2006.01) |
| *G01S 17/931* | (2020.01) |
| *G01S 7/481* | (2006.01) |
| *G02B 26/12* | (2006.01) |

(52) U.S. Cl.
CPC ............... *G01S 17/42* (2013.01); *G01S 7/48* (2013.01); *G01S 7/4814* (2013.01); *G01S 17/89* (2013.01); *G01S 17/931* (2020.01); *G02B 26/123* (2013.01)

(58) Field of Classification Search
CPC ........ G01S 17/42; G01S 17/89; G01S 17/931; G01S 7/48; G01S 7/4814; G02B 26/123
See application file for complete search history.

(56) References Cited

U.S. PATENT DOCUMENTS

| | | | |
|---|---|---|---|
| 5,012,745 A | | 5/1991 | Yamashita |
| 5,170,458 A | | 12/1992 | Aoyagi |
| 5,212,738 A | * | 5/1993 | Chande ............... F27D 21/0021 382/152 |
| 5,590,604 A | | 1/1997 | Lund |
| 5,598,783 A | | 2/1997 | Lund |

(Continued)

FOREIGN PATENT DOCUMENTS

| | | |
|---|---|---|
| CA | 3027331 | 2/2017 |
| CN | 102494609 | 6/2012 |

(Continued)

OTHER PUBLICATIONS

Examination Report No. 1 in AU 2017225790 dated Sep. 3, 2018.

(Continued)

*Primary Examiner* — Reza Aghevli
(74) *Attorney, Agent, or Firm* — Dority & Manning, P.A.

(57) ABSTRACT

A LIDAR sensor for an autonomous vehicle (AV) can include one or more lasers outputting one or more laser beams, one or more non-mechanical optical components to (i) receive the one or more laser beams, (ii) configure a field of view of the LIDAR sensor, and (iii) output modulated frequencies from the one or more laser beams, and one or more photodetectors to detect return signals based on the outputted modulated frequencies from the one or more laser beams.

13 Claims, 5 Drawing Sheets

(56) References Cited

U.S. PATENT DOCUMENTS

| | | | |
|---|---|---|---|
| 5,726,647 A | 3/1998 | Waffler | |
| 6,122,040 A | 9/2000 | Arita | |
| 6,434,302 B1 | 8/2002 | Fidric | |
| 6,657,705 B2 | 12/2003 | Sano | |
| 6,827,265 B2 | 12/2004 | Knowles | |
| 6,860,350 B2 | 3/2005 | Beuhler | |
| 6,956,227 B2 | 10/2005 | Miyazaki | |
| 7,248,342 B1 | 7/2007 | Deqnan | |
| 7,406,220 B1 | 7/2008 | Christensen | |
| 7,532,311 B2 | 5/2009 | Henderson | |
| 7,650,239 B2 | 1/2010 | Samukawa | |
| 7,961,301 B2 | 6/2011 | Earhart | |
| 8,164,742 B1* | 4/2012 | Carrieri | G01S 7/499 356/3.01 |
| 8,208,716 B2 | 6/2012 | Choi | |
| 8,344,940 B2 | 1/2013 | Jeonq | |
| 8,610,881 B2 | 12/2013 | Gammenthaler | |
| 8,692,980 B2 | 4/2014 | Gilliland | |
| 8,736,818 B2 | 5/2014 | Weimer | |
| 8,767,186 B2 | 7/2014 | Lu | |
| 8,797,828 B1 | 8/2014 | Lev | |
| 8,899,903 B2 | 12/2014 | Saad | |
| 8,909,375 B2 | 12/2014 | Larson | |
| 8,994,581 B1 | 3/2015 | Brown | |
| 8,996,224 B1 | 3/2015 | Louie | |
| 9,126,595 B2 | 9/2015 | Seo | |
| 9,201,424 B1 | 12/2015 | Ogale | |
| 9,224,053 B1 | 12/2015 | Ferguson | |
| 9,228,833 B2 | 1/2016 | Zenq | |
| 9,231,998 B2 | 1/2016 | Lu | |
| 9,247,211 B2 | 1/2016 | Zhang | |
| 9,328,526 B2 | 5/2016 | Shani | |
| 9,360,554 B2 | 6/2016 | Retterath | |
| 9,383,753 B1 | 7/2016 | Templeton | |
| 9,453,914 B2 | 9/2016 | Stettner | |
| 9,454,150 B2 | 9/2016 | Uehara | |
| 9,529,079 B1 | 12/2016 | Droz | |
| 9,625,582 B2 | 4/2017 | Gruver | |
| 9,637,118 B2 | 5/2017 | Yokota | |
| 9,669,827 B1 | 6/2017 | Ferguson | |
| 9,696,722 B1 | 7/2017 | Ulrich | |
| 9,719,801 B1 | 8/2017 | Ferguson | |
| 9,720,415 B2 | 8/2017 | Levinson | |
| 9,804,264 B2 | 10/2017 | Villeneuve | |
| 9,823,353 B2 | 11/2017 | Eichenholz | |
| 9,840,256 B1 | 12/2017 | Valois | |
| 9,841,495 B2 | 12/2017 | Campbell | |
| 9,841,763 B1 | 12/2017 | Valois | |
| 9,857,468 B1 | 1/2018 | Eichenholz | |
| 9,869,753 B2 | 1/2018 | Eldada | |
| 9,869,754 B1 | 1/2018 | Campbell | |
| 9,874,635 B1 | 1/2018 | Eichenholz | |
| 9,880,263 B2 | 1/2018 | Droz | |
| 9,897,687 B1 | 2/2018 | Campbell | |
| 10,281,923 B2* | 5/2019 | Boehmke | G05D 1/024 |
| 10,338,225 B2* | 7/2019 | Boehmke | G01S 17/931 |
| 10,479,376 B2* | 11/2019 | Meyhofer | G01S 17/931 |
| 10,677,925 B2* | 6/2020 | Boehmke | G01S 17/42 |
| 10,942,524 B2* | 3/2021 | Boehmke | G01S 17/931 |
| 2002/0135468 A1 | 9/2002 | Bos | |
| 2004/0030474 A1 | 2/2004 | Samuel | |
| 2004/0148093 A1 | 7/2004 | Tanaka | |
| 2004/0174537 A1 | 9/2004 | Ferger | |
| 2005/0095092 A1 | 5/2005 | Segal | |
| 2005/0185846 A1 | 8/2005 | Luo | |
| 2005/0196015 A1 | 9/2005 | Luo | |
| 2005/0196035 A1 | 9/2005 | Luo | |
| 2006/0089765 A1 | 4/2006 | Pack | |
| 2006/0149134 A1 | 7/2006 | Soper | |
| 2006/0158423 A1 | 7/2006 | Kern | |
| 2006/0227317 A1 | 10/2006 | Henderson | |
| 2007/0046448 A1* | 3/2007 | Smitherman | G01C 11/02 348/143 |
| 2007/0200064 A1 | 8/2007 | Remillard | |
| 2007/0212006 A1 | 9/2007 | Wysocki | |
| 2007/0219720 A1 | 9/2007 | Trepangier | |
| 2008/0002427 A1 | 1/2008 | Kropac | |
| 2008/0039991 A1 | 2/2008 | May | |
| 2008/0136626 A1 | 6/2008 | Hudson | |
| 2008/0161986 A1 | 7/2008 | Breed | |
| 2008/0215184 A1 | 9/2008 | Choi | |
| 2009/0115994 A1 | 5/2009 | Stettner | |
| 2009/0123158 A1* | 5/2009 | Ray | G01S 7/4972 398/140 |
| 2009/0312906 A1 | 12/2009 | Bauer | |
| 2009/0319112 A1 | 12/2009 | Freqene | |
| 2010/0013615 A1 | 1/2010 | Hebert | |
| 2010/0016523 A1 | 1/2010 | Fiess | |
| 2010/0020306 A1 | 1/2010 | Hall | |
| 2010/0053715 A1* | 3/2010 | O'Neill | G02B 26/105 356/3 |
| 2010/0110192 A1 | 5/2010 | Johnston | |
| 2010/0165323 A1 | 7/2010 | Fiess | |
| 2010/0182587 A1 | 7/2010 | Fluckiqer | |
| 2010/0185353 A1 | 7/2010 | Barwick | |
| 2010/0194890 A1 | 8/2010 | Weller | |
| 2010/0208034 A1 | 8/2010 | Chen | |
| 2010/0208244 A1 | 8/2010 | Earhart | |
| 2010/0235095 A1* | 9/2010 | Smitherman | G03B 37/04 702/94 |
| 2011/0050855 A1 | 3/2011 | Nobis | |
| 2011/0134249 A1 | 6/2011 | Wood | |
| 2011/0166757 A1 | 7/2011 | Otanez | |
| 2011/0184605 A1 | 7/2011 | Neff | |
| 2011/0241845 A1 | 10/2011 | Sullivan | |
| 2011/0245964 A1 | 10/2011 | Sullivan | |
| 2011/0301786 A1 | 12/2011 | Allis | |
| 2011/0317993 A1 | 12/2011 | Weissler | |
| 2012/0008129 A1 | 1/2012 | Lu | |
| 2012/0033196 A1 | 2/2012 | Vanek | |
| 2012/0038903 A1 | 2/2012 | Weimer | |
| 2012/0044476 A1 | 2/2012 | Earhart | |
| 2012/0154785 A1 | 6/2012 | Gilliland | |
| 2012/0239238 A1 | 9/2012 | Harvey | |
| 2012/0274937 A1* | 11/2012 | Hays | G01S 17/95 356/450 |
| 2013/0013185 A1* | 1/2013 | Smitherman | H04N 23/55 348/148 |
| 2013/0078063 A1 | 3/2013 | Shanil | |
| 2013/0166105 A1 | 6/2013 | Wastel | |
| 2013/0190963 A1 | 7/2013 | Kuss | |
| 2013/0226431 A1 | 8/2013 | Lu | |
| 2013/0237811 A1* | 9/2013 | Mihailescu | A61B 34/20 600/407 |
| 2013/0314694 A1* | 11/2013 | Tchoryk, Jr. | G01S 17/58 356/28.5 |
| 2013/0317649 A1 | 11/2013 | Larson | |
| 2013/0321629 A1* | 12/2013 | Zhang | G06T 7/80 348/148 |
| 2014/0041966 A1 | 2/2014 | Healy | |
| 2014/0136414 A1 | 5/2014 | Abhyanker | |
| 2014/0152823 A1* | 6/2014 | Breed | B60R 25/257 348/148 |
| 2014/0168631 A1 | 6/2014 | Haslim | |
| 2014/0176933 A1 | 6/2014 | Haslim | |
| 2014/0231647 A1 | 8/2014 | Chinn | |
| 2014/0277691 A1 | 9/2014 | Jacobus | |
| 2014/0286744 A1 | 9/2014 | Shani | |
| 2015/0025731 A1 | 1/2015 | Uehara | |
| 2015/0091374 A1 | 4/2015 | Lenius | |
| 2015/0202939 A1 | 7/2015 | Stettner | |
| 2015/0219764 A1* | 8/2015 | Lipson | G01S 7/4815 356/4.01 |
| 2015/0293225 A1 | 10/2015 | Riley | |
| 2015/0293228 A1 | 10/2015 | Retterath | |
| 2015/0334269 A1 | 11/2015 | Yokota | |
| 2016/0003946 A1 | 1/2016 | Gilliland | |
| 2016/0129917 A1 | 5/2016 | Garieov | |
| 2016/0223671 A1 | 8/2016 | Thayer | |
| 2016/0227193 A1 | 8/2016 | Osterwood | |
| 2016/0231746 A1 | 8/2016 | Hazelton | |
| 2016/0245902 A1* | 8/2016 | Watnik | G01S 7/4815 |

(56) References Cited

U.S. PATENT DOCUMENTS

| | | | |
|---|---|---|---|
| 2016/0252619 A1* | 9/2016 | Markendorf | G01S 17/86 356/3.01 |
| 2016/0282468 A1 | 9/2016 | Gruver | |
| 2016/0291134 A1* | 10/2016 | Droz | G01S 7/4817 |
| 2016/0318415 A1 | 11/2016 | Salasoo | |
| 2016/0349746 A1 | 12/2016 | Grau | |
| 2016/0356890 A1* | 12/2016 | Fried | G01S 7/4863 |
| 2017/0096138 A1 | 4/2017 | Reiff | |
| 2017/0155225 A1 | 6/2017 | Villeneuve | |
| 2017/0168146 A1 | 6/2017 | Boehmke | |
| 2017/0184399 A1 | 6/2017 | Thayer | |
| 2017/0226765 A1 | 8/2017 | Wastel | |
| 2017/0255199 A1 | 9/2017 | Boehmke | |
| 2017/0357260 A1 | 12/2017 | Gilliland | |
| 2018/0070804 A1 | 3/2018 | Tesar | |
| 2018/0149732 A1 | 5/2018 | Droz | |
| 2018/0329067 A1 | 11/2018 | Boehmke | |
| 2019/0146505 A1 | 5/2019 | Boehmke | |
| 2019/0235054 A1 | 8/2019 | Ratner | |

FOREIGN PATENT DOCUMENTS

| | | |
|---|---|---|
| CN | 101959022 | 11/2012 |
| CN | 103152518 | 6/2013 |
| CN | 103179339 | 6/2013 |
| CN | 203353019 | 12/2013 |
| CN | 104133473 | 11/2014 |
| CN | 103001428 | 5/2015 |
| CN | 102857592 | 12/2015 |
| CN | 204990755 | 1/2016 |
| CN | 103146355 | 2/2016 |
| CN | 106313078 | 1/2017 |
| CN | 207908673 | 9/2018 |
| DE | 10244638 | 4/2004 |
| EP | 0185816 | 7/1986 |
| EP | 2940489 | 11/2015 |
| EP | 1816514 | 8/2017 |
| JP | H09163197 | 12/1998 |
| JP | H09326032 | 6/1999 |
| JP | 2011088623 | 4/2001 |
| JP | 2005024463 | 1/2005 |
| JP | 2007249632 | 9/2007 |
| JP | 2008104254 | 5/2008 |
| JP | 2011123078 | 12/2010 |
| JP | 2014053408 | 3/2014 |
| RU | 2493988 | 9/2013 |
| RU | 2012154453 | 6/2014 |
| RU | 2014146890 | 6/2016 |
| WO | WO2011104706 | 9/2011 |
| WO | WO2014129386 | 8/2014 |

OTHER PUBLICATIONS

Notice of Allowance in CA 3,015,894 dated Sep. 14, 2018.
Office Action in CA 2,902,430 dated Dec. 15, 2017.
Office Action in CN 201780022918.8 dated Feb. 21, 2020.
Office Action in CN 201780022918.8 dated Aug. 16, 2019.
Office Action in CN201480022190.5 dated Aug. 22, 2017.
Office Action in EP 14770009.0 dated Apr. 24, 2019.
Office Action in JP 2016-502343 dated Jan. 18, 2018.
PESR in EP 17760835.3 dated Jan. 24, 2019.
Extended European Search Report in EP 17760835.3, dated May 2, 2019.
International Preliminary Report on Patentability for PCT/2017/020483, dated Sep. 13, 2018.
International Search Report and Written Opinion for PCT/US2017/020483 dated Jun. 29, 2017.
International Search Report and Written Opinion for PCT/US2018/023885, dated Aug. 16, 2018.
International Search Report and Written Opinion for PCT/US2019/015882 dated May 16, 2019.

* cited by examiner

ADJUSTABLE BEAM PATTERN FOR LIDAR SENSOR

CROSS-REFERENCE TO RELATED APPLICATIONS

This application is a Continuation of U.S. patent application Ser. No. 16/035,862, filed on Jul. 16, 2018; which is a Continuation of U.S. patent application Ser. No. 15/379,854, filed on Dec. 15, 2016, now U.S. Pat. No 10,338,225; which claims the benefit of U.S. Provisional Patent Application No. 62/267,785, filed Dec. 15, 2015; the aforementioned applications being hereby incorporated by reference in their respective entireties.

BACKGROUND

Automated or autonomous vehicles (AVs) may require continuous processing of sensor data provided by an on-board laser imaging, detection, and ranging (LIDAR) sensor system. For fixed-beam LIDAR systems, the granularity for detected objects, such as obstacles and potential road hazards, becomes increasingly coarser in relation to distance.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

Current LIDAR technology include fixed-beam LIDAR systems that include laser sources, scanners, optical systems (e.g., a beam splitter), and photodetectors. For example, cutting edge LIDAR systems can include pulse rates on the order of one million pulses per second producing a detailed point cloud map of an AV's surroundings at ranges upwards of one hundred-plus meters. When using typical fixed-beam LIDAR systems for AVs traveling through road traffic, operational speed may be limited by the nature of the beam pattern produced by the LIDAR system. For example, in order to ensure safety for an AV traveling at 15 miles per hour (mph), the LIDAR system may require at least twelve separate beams to readily detect potential hazards with sufficient granularity and decelerate, maneuver, and/or stop the AV accordingly. However, when the AV travels at a very high speed (e.g., 60 mph, 75 mph, etc.), in order to achieve the same granularity for potential hazards in order to safely react, decelerate, and/or stop the AV, a fixed-beam LIDAR system may require well over seventy separate beams.

Increasing the number of fixed beams also places additional requirements for the LIDAR system. For example, the LIDAR will require more power, greater processing capability, larger or more sensitive photodetector and receiving equipment, constrained optics, and generally greater weight and more space. Furthermore, cost and waste quickly become an issue when increasing the number of fixed-beams, since the fixed-beam pattern or the fixed-beam LIDAR system must be tuned for a maximum operational speed of the AV. If AVs are going to operate safely with LIDAR technology on public highways at high speed, then alternative arrangements may be necessary to avoid spiraling costs, wasted power, additional equipment, and increased processing requirement.

To address the shortcomings of various fixed-beam LIDAR systems, a LIDAR sensor configuration system is provided with an adjustable-beam LIDAR sensor to control various adjustable parameters of the LIDAR sensor while an AV travels on a given road. The LIDAR configuration system can include a sensor controller that executes sensor configuration logic to adjust the configurable parameters in response to AV feedback from, for example, a control system of the AV. The configurable parameters of the LIDAR sensor can include a beam pattern (e.g., provided by a light source of the LIDAR), such as a vertical beam pattern that adjusts a vertical field of view of the LIDAR sensor. The configurable parameters can also include a rotational speed of the LIDAR system, a scan rate, a pulse rate, a beam frequency (e.g., a visible versus an infrared laser frequency), a photo-detector sensitivity, and the like. The feedback data provided to the LIDAR configuration system can include a current speed of the AV, road conditions (e.g., type of road, road wetness, potholes, etc.), weather conditions (e.g., whether precipitation is detected), traffic conditions, pedestrian activity, road geometry (e.g., advance knowledge of road curves, gradients, etc. using a map or sensor data from the LIDAR itself) driving parameters (e.g., a turn rate, acceleration and/or braking of the AV), and the like.

According to examples described herein, the LIDAR configuration system can receive the feedback data from a control system of the AV, where the control system operates the steering, acceleration, and braking systems. Additionally or alternatively, the LIDAR configuration system can receive feedback as sensor data directly from a sensor array (e.g., LIDAR data from the LIDAR itself). In variations, the LIDAR configuration system can receive feedback data from an on-board computing system, such as a data processing system, of the AV. The LIDAR configuration system can respond to the feedback data by adjusting any number of the adjustable parameters of the LIDAR sensor.

For example, the LIDAR configuration system can dynamically adjust a vertical angular spacing between each beam based on the speed of the AV. Specifically, the LIDAR configuration system can dynamically increase the vertical angular spacing of the beams as the AV decreases speed, and dynamically decrease the vertical angular spacing of the beams as the AV increases speed. In many aspects, the LIDAR sensor system can include components having adjustable parameters, such as a rotational motor that can be adjusted to control a scan rate or horizontal sweep rate of the beam pattern, and mirror actuators that can be adjusted to control the vertical field of view or vertical sweep of the beam pattern. Each of these components can be dynamically adjusted by the LIDAR configuration system in response to the feedback from the AV.

As another example, precipitation can significantly reduce the effectiveness of the LIDAR sensor to detect potential road hazards. As such, the AV control system may operate the AV in a high-caution mode, reducing speed, increasing processing power, and maintaining large gaps between the AV and any potential hazard. In certain implementations, the LIDAR configuration system can also operate in a high-caution mode by, for example, increasing a scan rate, and adjusting the horizontal and vertical sweep pattern of the LIDAR sensor to provide more detailed data for the AV's on-board data processing system.

In some aspects, the optics of the LIDAR may be such that a general vertical angle of the beams may be adjusted, in addition to the vertical spacing between the beams. For example, the feedback data can include a road gradient of the current road traveled by the AV (e.g., a mapping resource can indicate that the road immediately in front of the AV curves upwardly). The LIDAR configuration system can compensate for the upward gradient of the road by adjusting the general vertical beam angle of the LIDAR sensor. That is, in addition to adjusting the angular spacing between beams, every beam may be also angled to adjust for the forward road gradient indicated in the feedback data. In certain implementations, the general angle may be adjusted to align with the detected angle, and may be limited based on the speed of the AV.

For example, National Highway Traffic and Safety Administration (NHTSA) regulations exist for public roads that correlate road speed with road gradient and gradient transitions. For example, the greater the speeds, the lower the gradient transition or curve of the road. According to certain aspects, the LIDAR configuration dynamically set boundaries for the general vertical angle of the beam pattern based on the speed of the AV, and in accordance with the NHTSA regulations, since the LIDAR configuration system can expect, with certainty, that the gradient will not increase or decrease beyond a certain rate.

In addition to the adjustable-beam LIDAR systems described herein, a fixed-beam LIDAR system is disclosed having optimized, uneven beam spacing for a wide variety of travel conditions. The fixed-beam LIDAR system can be calibrated to provide optimal beam spacing for short, medium, and long distance range, all in one set of lasers. In one example, the beam angles can progressively decrease or converge along the length of the laser configuration (e.g., from the bottom to top). In variations, the beam angles can be optimally calibrated and configured individually. For example, the beam angles can be individually calibrated based on distance, anticipated speeds, vehicle dynamics, typical road gradients, and the like, and can comprise uneven beam spacing for optimal use in a wide variety of environments (e.g., urban scenarios and well as open, rural roads). In further variations, a combination of fixed-beam and adjustable beam laser configuration can be implemented in LIDAR sensors described herein.

Among other benefits, the examples described herein achieve a technical effect of providing adjustability for LIDAR sensors in order to increase data quality, reduce costs, reduce processing requirements, and reduce the number of beams necessary for typical road travel for AVs.

As used herein, the AV's LIDAR system implements remote sensing using laser beams, which can include diode lasers, fiber lasers, and the like. "LIDAR" is used herein as a representation of any light detection and ranging systems utilized on an AV. Such systems may be referred to as "LIDAR" or "LADAR" systems. For the sake of brevity, "LIDAR" is used throughout to represent any of such systems should distinctions be made in the common nomenclature for future reference.

As used herein, a computing device refer to devices corresponding to desktop computers, cellular devices or smartphones, personal digital assistants (PDAs), field programmable gate arrays (FPGAs), laptop computers, tablet devices, television (IP Television), etc., that can provide network connectivity and processing resources for communicating with the system over a network. A computing device can also correspond to custom hardware, in-vehicle devices, or on-board computers, etc. The computing device can also operate a designated application configured to communicate with the network service.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, printers, digital picture frames, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples disclosed herein can be carried and/or executed. In particular, the numerous machines shown with examples of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

System Description

Figure 1:
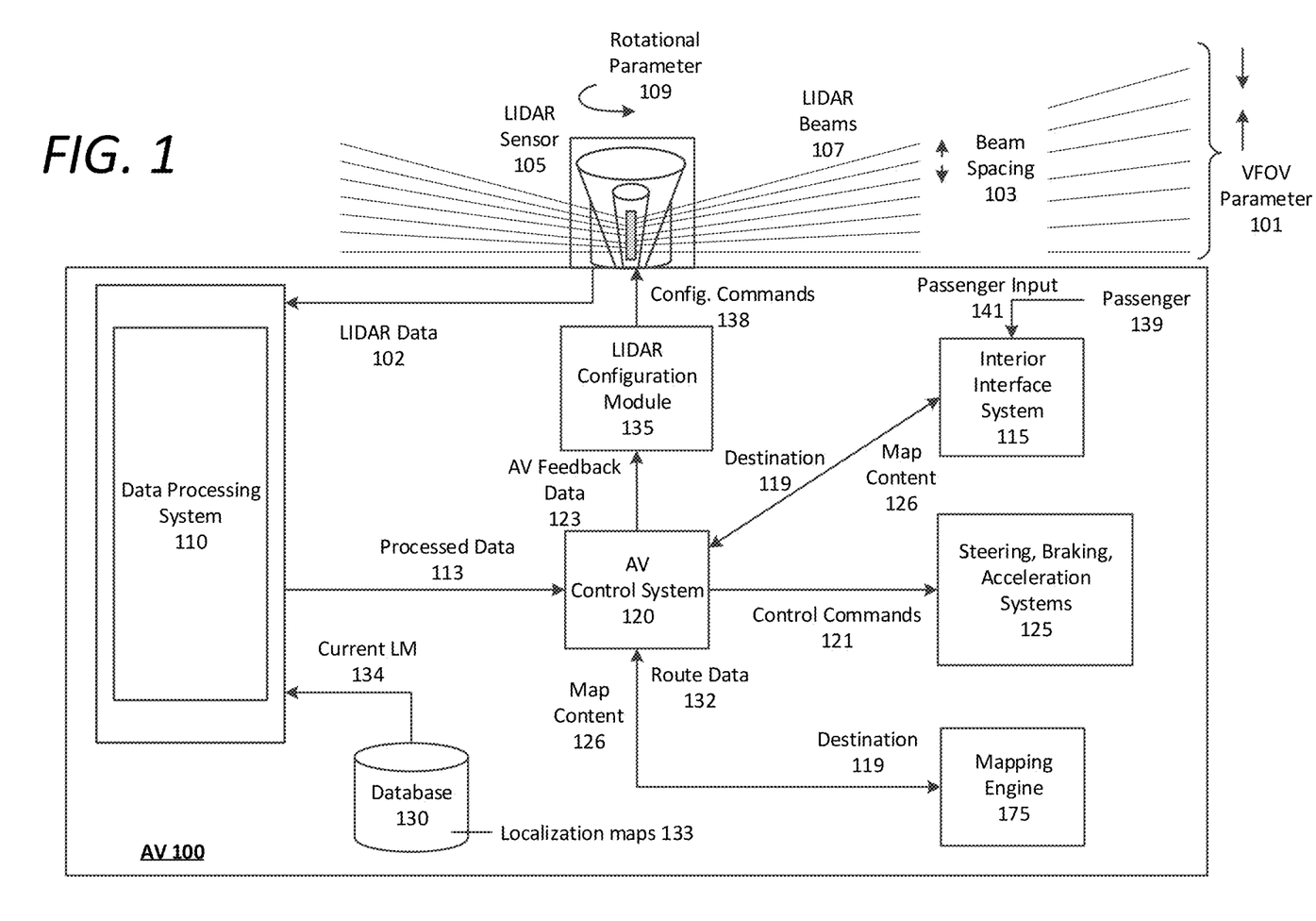
FIG. 1 is a block diagram illustrating an example AV including a LIDAR sensor configuration module, as described herein.

FIG. 1 is a block diagram illustrating an example AV 100 including a LIDAR sensor configuration module 135, as described herein. The AV 100 can include an adjustable-beam LIDAR sensor 105 that can provide LIDAR data 102 to an on-board data processing system 110 of the AV 100. In some examples, the LIDAR sensor 105 can comprise a light source (e.g., a laser), a photodetector, scanner components (e.g., which can include a mirror(s), one or more motor(s), and one or more actuator(s)), and circuitry to couple to various components of the AV 100. The data processing system 110 can utilize the LIDAR data 102 to detect the situational conditions of the AV 100 as the AV 100 travels along a current route. For example, the data processing system 110 can identify potential obstacles or road hazards—such as pedestrians, bicyclists, objects on the road, road cones, road signs, animals, etc.—in order to enable an AV control system 120 to react accordingly.

In certain implementations, the data processing system 110 can utilize localization maps 133 stored in a database 130 of the AV 100 in order to perform localization and pose operations to determine a current location and orientation of the AV 100 in relation to a given region (e.g., a city). The localization maps 133 can comprise previously recorded sensor data, such as stereo camera data, radar maps, and/or LIDAR maps that enable the data processing system 110 to compare the LIDAR data 102 from the LIDAR sensor 105 with a current localization map 134 to identify such obstacles and potential road hazards in real time. The data processing system 110 can provide the processed sensor data 113—identifying such obstacles and road hazards—to AV control system 120, which can react accordingly by operating the steering, braking, and acceleration systems 125 of the AV 100.

In many implementations, the AV control system 120 can receive a destination 119 from, for example, an interior interface system 115 of the AV 100. The interior interface system 115 can include any number of touch-screens or voice sensors that enable a passenger 139 to provide a passenger input 141 indicating the destination 119. For example, the passenger 139 can type the destination 119 into a mapping engine 175 of the AV 100, or can speak the destination 119 into the interior interface system 115. Additionally or alternatively, the destination 119 can be received by the AV 100 as a communication from a backend system that manages routes for a fleet of AVs. The backend system can be operative to facilitate passenger pick-ups and drop-offs to generally service pick-up requests, facilitate delivery such as packages, food, goods, or animals, and the like.

Based on the destination 119 (e.g., a pick-up location), the AV control system 120 can utilize the mapping engine 175 to receive route data 132 indicating a route to the destination 119. In variations, the mapping engine 175 can also generate map content 126 dynamically indicating the route traveled to the destination 119. The route data 132 and/or map content 126 can be utilized by the AV control system 120 to maneuver the AV 100 to the destination 119 along the selected route. For example, the AV control system 120 can dynamically generate control commands 121 for the AV's steering, braking, and acceleration system 125 to actively drive the AV 100 to the destination 119 along the selected route. Optionally, the map content 126 showing the current route traveled can be streamed to the interior interface system 115 so that the passenger(s) 139 can view the route and route progress in real time.

In many examples, while the AV control system 120 operates the steering, braking, and acceleration systems 125 along the current route on a high level, the processed data 113 provided to the AV control system 120 can indicate low level occurrences, obstacles, and potential hazards to which the AV control system 120 can react. For example, the processed data 113 can indicate a pedestrian crossing the road, traffic signals, stop signs, other vehicles, road conditions, traffic conditions, bicycle lanes, crosswalks, pedestrian activity (e.g., a crowded adjacent sidewalk), and the like. The AV control system 120 can respond to the processed data 113 by generating control commands 121 to reactively operate the steering, braking, and acceleration systems 125 accordingly.

According to examples described herein, the AV 100 can include a LIDAR configuration module 135 to receive AV feedback data 123 from the AV control system 120 in order to configure various adjustable parameters of the LIDAR sensor 105. The AV feedback data 123 can include data indicating the current speed of the AV 100, any of the described obstacles and/or potential hazards, weather conditions identified by the data processing system 110 (e.g., rain or snow), forward road features (e.g., an imminent gradient of the road), traffic conditions, a turn rate and/or an acceleration rate, and the like.

The LIDAR configuration module 135 can respond to the AV feedback data 123 by adjusting one or more adjustable parameters of the LIDAR sensor 105. For example, the LIDAR configuration module 135 can generate configuration commands 138 in response to the AV feedback data 123 to adjust a rotational parameter 109 of the LIDAR sensor 105 (e.g., the rotational speed of the motor), a vertical field of view (VFOV) parameter 101 of the LIDAR sensor 105, a number of emitted LIDAR beams 107 by the LIDAR sensor 105, and/or a beam spacing 103 or angular spacing between the LIDAR beams 107 themselves.

One or more components of the LIDAR sensor 105 can comprise non-mechanical aspects that cause the LIDAR beams 107 to adjust their beam angles in response to autonomous driving characteristics by the AV control system 120, such as vehicle velocity, acceleration, braking inputs, steering inputs, and the like. In one aspect, the angle of the LIDAR beam 107 may be wholly adjusted non-mechanically, or may be adjusted through a combination of mechanical and non-mechanical features. In variations, the LIDAR configuration module 135 can generate configuration commands 138 that are executable on mechanical components of the LIDAR sensor 105 to adjust the beam spacing 103 of the LIDAR beams 107 in response to the AV feedback data 123.

As an example, when the AV 100 is traveling at low speeds, the LIDAR configuration module 135 can dynamically increase the angular beam spacing 103 between the LIDAR beams 107 since (i) the reaction and stopping distances are much lower at low speeds, and (ii) an increased VFOV may necessary to detect objects close to the AV 100. Conversely, when the AV 100 accelerates to higher speeds, the LIDAR configuration module 135 can dynamically narrow the VFOV parameter 101, decreasing the angular beam spacing 103, since (i) the reaction and stopping distances increase, thereby requiring finer granularity in the LIDAR data 102 to detect objects further down the road, (ii) a decreased field of view may be suitable for increased speeds since more proximate objects can be detected earlier, and (iii) at higher speeds, NHTSA guidelines specify road geometries that make decreased field of view suitable. Detailed discussion is provided with regard to the LIDAR configuration module 135 with respect to FIG. 2 below.

Figure 2:
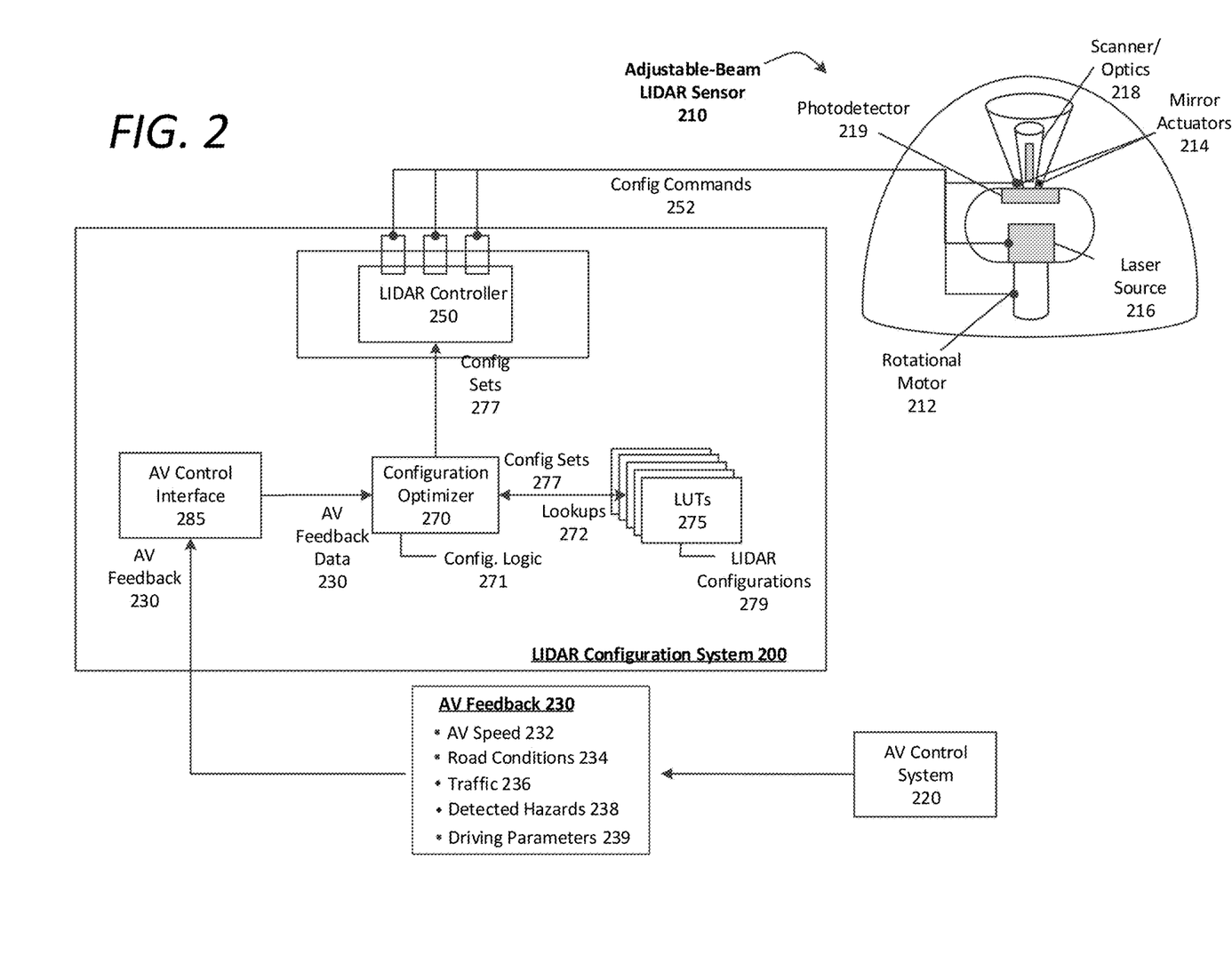
FIG. 2 is a block diagram illustrating an example LIDAR sensor configuration system utilized in connection with a LIDAR sensor, as described herein.

FIG. 2 is a block diagram illustrating an example LIDAR sensor configuration system 200 utilized in connection with an adjustable-beam LIDAR sensor 210, as described herein. The LIDAR configuration system 200 may be implemented as a component of the AV 100 described in connection with FIG. 1. Furthermore, the LIDAR configuration system 200 shown and described with respect to FIG. 2, can include the same or similar functionality as the LIDAR configuration module 135 shown and described with respect to FIG. 1. Referring to FIG. 2, the LIDAR configuration system 200 can include an AV control interface 285 to receive the AV feedback data 230 from the AV control system 220. As described herein, the AV feedback data 230 can include various aspects of the AV's speed 232, the road conditions 234 (e.g., road gradient, wet versus dry conditions, lane count, etc.), traffic conditions 236 (e.g., light, moderate, or heavy traffic), detected hazards 238 (e.g., identified pedestrians, bicyclists, road objects, etc.), and/or driving parameters 239 (e.g., acceleration rate, braking rate, and/or turning rate).

Furthermore, as provided herein, the LIDAR configuration system 200 is shown as a standalone module for illustrative purposes. However, various functions of the LIDAR configuration system 200 may be performed by separate processing components of the AV 100 itself. For example, one or more of the data processing system 110, the AV control system 120, or one or more sensor processor(s) contained within the sensor system itself (e.g. the adjustable beam LIDAR sensor 210 shown in FIG. 2) can perform any number of functions or actions described in connection with the LIDAR configuration system 200. Additionally, any of the various commands transmitted between the blocks shown in FIG. 2 may be transmitted and received via a computer network either wirelessly or via wired communication.

The AV control interface 285 can provide the AV feedback data 230 to a configuration optimizer 270 which can process the AV feedback data 230 to optimize the LIDAR configurations for the LIDAR sensor 210 accordingly. In certain examples, the configuration optimizer 270 can execute configuration logic 271 to perform a lookup 272 in a number of lookup tables (LUTs 275) to select an optimal set of configurations 277 from any number of LIDAR configurations 279 logged or chronicled in the LUTs 275. In variations, the configuration optimizer 270 can execute the configuration logic 271 to dynamically determine the optimal set of configurations 277 to be executed by a LIDAR controller 250 of the LIDAR configuration system 200. The dynamically determined configuration sets 277 can consequently be dynamically executed by the LIDAR controller 250 to generate the configuration commands 252 that actively adjust the configurable parameters of the LIDAR sensor 210.

As provided herein, the dynamically executed set of configurations 277 can cause the LIDAR controller to generate configuration commands 252 that operate on adjustable parameters of the LIDAR sensor 210, such as a rotational motor 212 that controls a rotational rate of the LIDAR beams and/or a scan rate of the LIDAR scanner 218. The LIDAR controller 250 can further generate configuration commands 252 that adjust a pulse rate and/or frequency of the laser by tuning a laser source 216 of the LIDAR sensor 210. For example, the LIDAR controller 250 can increase or decrease power to the laser source 216, increase or decrease the pulse rate (e.g., to increase or decrease granularity of the point cloud), and/or modulate the frequency of the beams themselves (e.g., modifying the reflectance parameters of the LIDAR sensor 210).

In many aspects, the LIDAR controller 250 can generate configuration commands 252 to operate mirror actuators 214 of the LIDAR sensor 210 which, in turn, can adjust the VFOV of the LIDAR sensor 210. Specifically, the LIDAR controller 250 can increase or decrease the VFOV of the LIDAR sensor 210 by operating the mirror actuators 214 in response to the speed of the AV. In some aspects, the mirror actuators 214 can split the emitted beams between positive VFOV beams, which detect the AV environment above a sensor plane parallel to the road, and negative VFOV beams, which detect the AV environment below the sensor plane. In response to the AV feedback data 230 the configuration optimizer 270 may generate and/or select a configuration set 277 can causes the LIDAR controller 250 to adjust a vertical beam pattern of the LIDAR sensor 210 for the positive VFOV beams differently in comparison to the negative VFOV beams. For example, when the AV is stopped at a stop light in a dense pedestrian environment, the configuration optimizer 270 may select a more spread out negative VFOV beam pattern to identify potential hazards within a much broader VFOV (e.g., a child standing next to the AV).

Examples described herein are not limited to mirror embodiments having mirror actuators. It is contemplated that VFOV adjustments can be made with adjustable beam splitters, directional laser apertures, or adjustable dual oscillating mirrors and/or polygonal mirrors. As an example, an adjustable laser grating of a LIDAR sensor 210 can be configured to dynamically adjust the vertical sweep of the beam pattern by compressing or spreading the angular spacing of the beams.

The LIDAR sensor 210 can further include a scanner and optics system 218 which can be configurable by the LIDAR controller 250. For example, the configuration optimizer 270 can select a set of configurations 277 that cause the scanner and optics system 218 to increase a scan rate in response to detecting precipitation. The increased scan rate can be executed in conjunction with, for example, the AV control system operating in a high-caution mode. Additionally, the LIDAR sensor 210 can include a photodetector 219 which, in certain aspects, can be voltage-adjustable for increased or decreased sensitivity.

Examples described herein improve upon current LIDAR technology by providing a LIDAR configuration system 200 that can dynamically configure the adjustable parameters of the AV's LIDAR sensor 210 in response to AV feedback 230 received from the AV control system 220 and/or other subsystems of the AV. In many aspects, the LIDAR configuration system 200 can dynamically adjust a vertical sweep pattern of the LIDAR sensor 210 by adjusting the angle, or the angular spacing between the beams. By adjusting the VFOV of the LIDAR sensor 210, the LIDAR configuration system 200 can require less beams than current fixed-beam systems, reducing costs and increasing data quality for the AV's on-board data processing system.

Methodology

Figure 3:
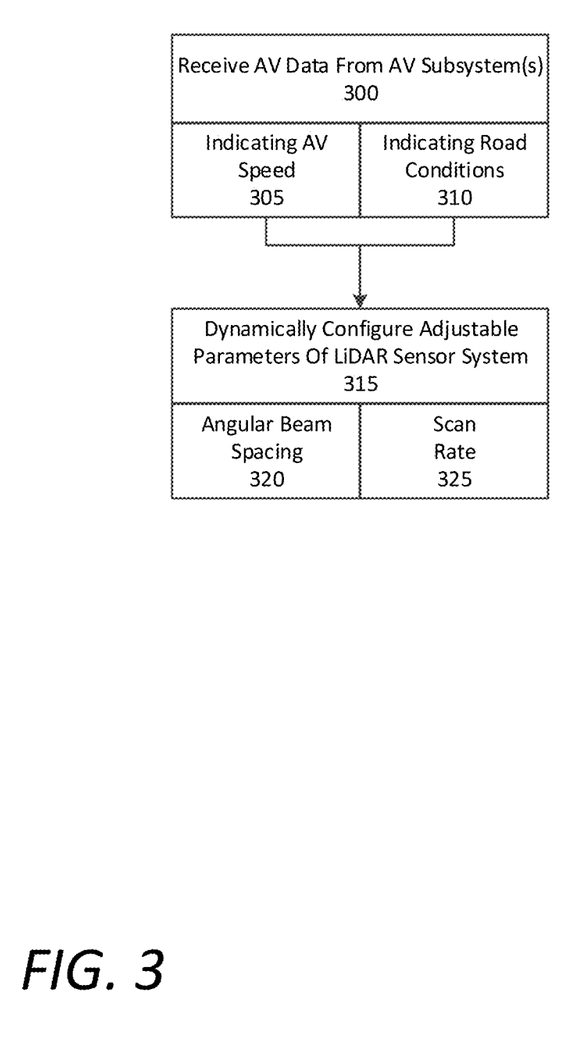
FIG. 3 is a high level flow chart describing an example method of dynamically configuring a LIDAR sensor.

FIG. 3 is a high level flow chart describing an example method of dynamically configuring a LIDAR sensor. In the below discussion of FIG. 3, reference may be made to like reference characters representing like features as shown and described with respect to FIGS. 1 and 2. For example, the high level method described with respect to FIG. 3 may be performed by an example LIDAR configuration module 135 shown and described with respect to FIG. 1, or the LIDAR configuration system 200 shown and described with respect to FIG. 2. Referring to FIG. 3, the LIDAR configuration system 200 can receive AV data 230 from subsystems of the AV 100, such as the AV control system 120 or the data processing system 110 (300). The AV data 230 can include information such as the AV's speed (305), and road conditions (310) which can indicate potential hazards as the AV 100 travels along a current route.

In response to the AV data 230, the LIDAR configuration system 200 can dynamically configure the adjustable parameters of the LIDAR sensor system 210 of the AV 100 (315). For example, the LIDAR configuration system 200 can dynamically adjust an angular beam spacing between the beams to control a VFOV (320) based on the speed of the AV 100. As another example, the LIDAR configuration system 200 can control a scan rate of the LIDAR sensor system 210 in response to the road conditions (325).

Figure 4:
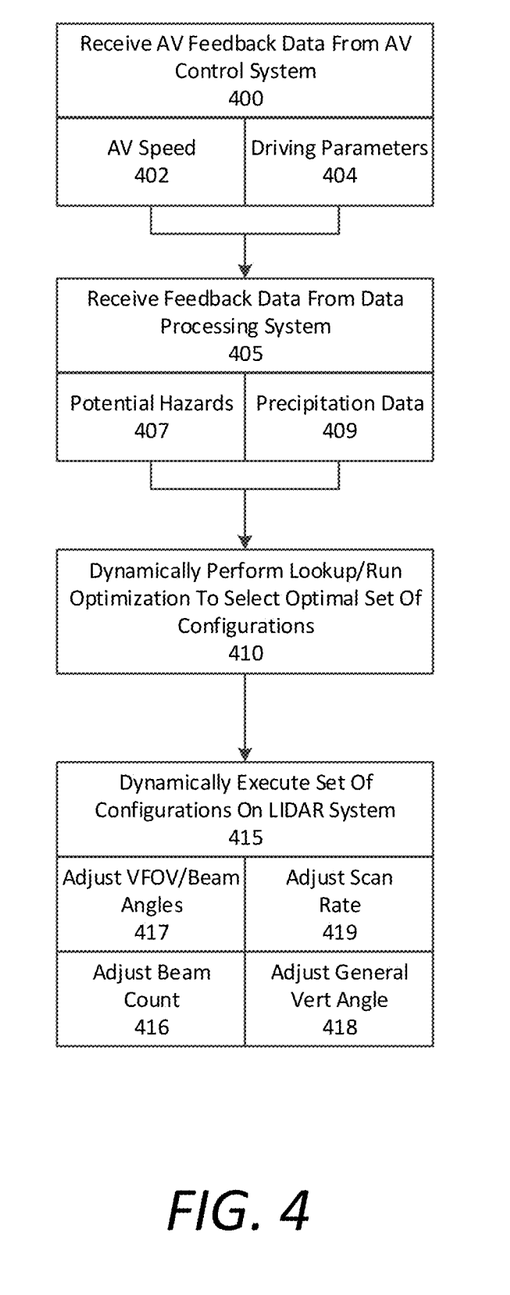
FIG. 4 is a low level flow chart describing an example method of configuring a LIDAR sensor, as described herein.

FIG. 4 is a low level flow chart describing an example method of configuring a LIDAR sensor, as described herein. In the below discussion of FIG. 4, reference may be made to like reference characters representing like features as shown and described with respect to FIGS. 1 and 2. For example, the low level method described with respect to FIG. 4 may be performed by an example LIDAR configuration module 135 shown and described with respect to FIG. 1, or the LIDAR configuration system 200 shown and described with respect to FIG. 2. Referring to FIG. 4, the LIDAR configuration system 200 can receive AV feedback data 230 from the AV control system 120 (400). The AV feedback data 230 from the AV control system 120 can include the current AV speed (402) and/or driving parameters of the AV 100 (404).

In certain implementations, the AV feedback data 230 can also be received from the data processing system 110 of the AV 100 (405). This data may include potential hazards on the road (407) and/or precipitation data (409). Based on the received feedback data 230 from the AV control system 120 and the on-board data processing system 110, the LIDAR configuration system 200 can dynamically perform a lookup 272 in a set of LUTs 275 or perform an optimization to select a set of configurations 277 for the LIDAR sensor system 210 (410). The LIDAR configuration system 200 may then dynamically execute the set of configurations 277 on the LIDAR system 210 (415).

In many aspects, execution of the configuration set 277 causes the LIDAR configuration system 200 to adjust a VFOV or the beams angles of the LIDAR sensor system 210 (417). Additionally or alternatively, the configuration set 277 can cause the LIDAR configuration system 200 to adjust a scan rate (419) and/or a beam count (416) for the LIDAR sensor system 210. In still other aspects, the LIDAR configuration system 200 can adjust a general vertical angle of the beams in response to detecting a road gradient (418).

Hardware Diagram

Figure 5:
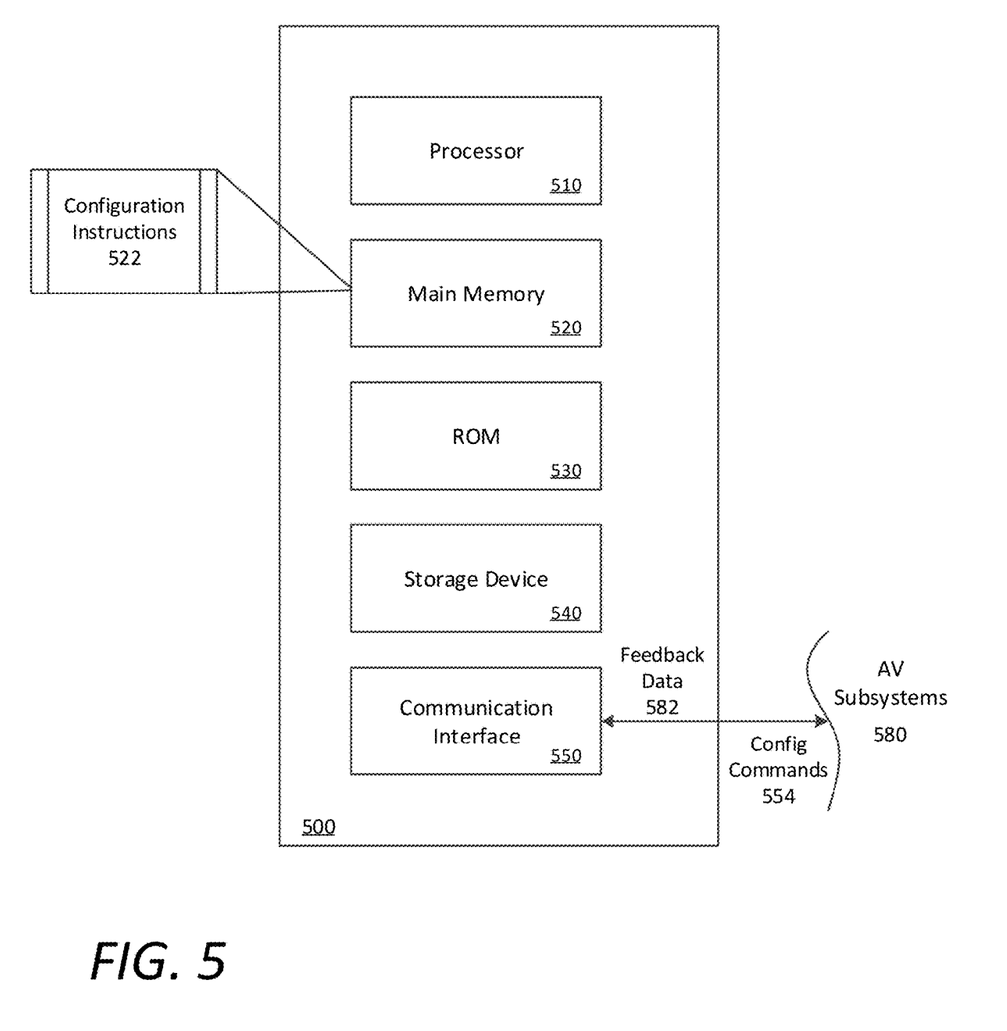
FIG. 5 is a block diagram illustrating an example computing system upon which examples described herein may be implemented.

FIG. 5 is a block diagram that illustrates a computer system upon which examples described herein may be implemented. A computer system 500 can be implemented on, for example, a server or combination of servers. For example, the computer system 500 may be implemented as part of a LIDAR configuration system 135, which itself may be implemented as a part of the AV's on-board data processing system 110. In the context of FIG. 1, the LIDAR configuration system 135 may include a sensor controller that executes sensor configuration logic or instructions, and can be implemented using a computer system such as described by FIG. 5. The LIDAR configuration system 135 may also be implemented using a combination of multiple computer systems as described in connection with FIG. 5.

In one implementation, the computer system 500 includes processing resources 510, a main memory 520, a read-only memory (ROM) 530, a storage device 540, and a communication interface 550. The computer system 500 includes at least one processor 510 for processing information stored in the main memory 520, such as provided by a random access memory (RAM) or other dynamic storage device, for storing information and instructions which are executable by the processor 510. The main memory 520 also may be used for storing temporary variables or other intermediate information during execution of instructions to be executed by the processor 510. The computer system 500 may also include the ROM 530 or other static storage device for storing static information and instructions for the processor 510. A storage device 540, such as a magnetic disk or optical disk, is provided for storing information and instructions.

The communication interface 550 enables the computer system 500 to communicate with one or more AV subsystems 580 over a network link (e.g., a wireless or wired link). In accordance with examples, the computer system 500 receives feedback data 582 from the AV subsystems 580. The executable instructions stored in the memory 530 can include configuration instructions 522, which the processor 510 executes to determine a set of configurations to configure the adjustable parameters of the AV's LIDAR sensor system 210 based on the feedback data 582.

The processor 510 is configured with software and/or other logic to perform one or more processes, steps and other functions described with implementations, such as described by FIGS. 1 through 4, and elsewhere in the present application.

Examples described herein are related to the use of the computer system 500 for implementing the techniques described herein. According to one example, those techniques are performed by the computer system 500 in response to the processor 510 executing one or more sequences of one or more instructions contained in the main memory 520. Such instructions may be read into the main memory 520 from another machine-readable medium, such as the storage device 540. Execution of the sequences of instructions contained in the main memory 520 causes the processor 510 to perform the process steps described herein. In alternative implementations, hard-wired circuitry may be used in place of or in combination with software instructions to implement examples described herein. Thus, the examples described are not limited to any specific combination of hardware circuitry and software.

It is contemplated for examples described herein to extend to individual elements and concepts described herein, independently of other concepts, ideas or system, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude claiming rights to such combinations.

What is claimed is:

1. A LIDAR sensor for an autonomous vehicle (AV), comprising:
one or more lasers outputting one or more laser beams;
one or more non-mechanical optical components to (i) receive the one or more laser beams, (ii) configure a field of view of the LIDAR sensor, and (iii) output modulated frequencies from the one or more laser beams, wherein the modulated frequencies are determined based on AV feedback data from a control system of the AV; and one or more photodetectors to detect return signals based on the outputted modulated frequencies from the one or more laser beams.

2. The LIDAR sensor of claim 1, wherein the one or more non-mechanical optical components comprises one or more beam splitters to output the modulated frequencies.

3. The LIDAR sensor of claim 2, wherein the one or more beam splitters comprise one or more adjustable beam splitters to configure a field of view of the LIDAR sensor.

4. The LIDAR sensor of claim 3, further comprising:
one or more processors to process the return signals and dynamically generate a live map of a surrounding environment of the AV.

5. The LIDAR sensor of claim 4, wherein the one or more processors receive the AV feedback data from the control system of the AV and adjust the field of view of the LIDAR sensor based on the AV feedback data.

6. The LIDAR sensor of claim 1, wherein the AV feedback data indicates a speed of the AV.

7. The LIDAR sensor of claim 4, wherein the one or more processors further identify a road gradient in a forward traveling direction of the AV, and dynamically adjust the field of view of the LIDAR sensor based on the road gradient.

8. The LIDAR sensor of claim 4, wherein the one or more processors detect that the AV is in a high caution mode and adjust the field of view of the LIDAR sensor based on the AV being in the high caution mode.

9. The LIDAR sensor of claim 1, wherein the outputted modulated frequencies modify one or more reflectance parameters of the LIDAR sensor.

10. The LIDAR sensor of claim 1, wherein the one or more lasers comprise a fiber laser.

11. The LIDAR sensor of claim 1, wherein the AV feedback data indicates one or more driving parameters of the AV.

12. The LIDAR sensor of claim 1, wherein the AV feedback data comprises road hazard data.

13. The LIDAR sensor of claim 1, wherein the AV feedback data comprises precipitation data.

* * * * *